US008762331B2

(12) United States Patent
Nettleton et al.

(10) Patent No.: US 8,762,331 B2
(45) Date of Patent: Jun. 24, 2014

(54) CONCURRENT TRANSACTIONS AND PAGE SYNCHRONIZATION

(75) Inventors: David J. Nettleton, Seattle, WA (US); Steven Bailey, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1040 days.

(21) Appl. No.: 10/879,665

(22) Filed: Jun. 29, 2004

(65) Prior Publication Data

US 2005/0289189 A1 Dec. 29, 2005

(51) Int. Cl.
*G06F 17/30* (2006.01)

(52) U.S. Cl.
CPC .............................. *G06F 17/30578* (2013.01)
USPC ......................................................... 707/614

(58) Field of Classification Search
USPC .......................... 707/615, 616, 638, 704, 614
See application file for complete search history.

(56) References Cited

U.S. PATENT DOCUMENTS

| | | | |
|---|---|---|---|
| 5,088,036 A * | 2/1992 | Ellis et al. ...................... | 707/206 |
| 5,355,477 A * | 10/1994 | Strickland et al. ............ | 707/690 |
| 5,544,345 A * | 8/1996 | Carpenter et al. ............ | 711/150 |
| 5,675,797 A | 10/1997 | Chung et al. | |
| 5,864,851 A * | 1/1999 | Breitbart et al. ................... | 707/8 |
| 5,963,945 A | 10/1999 | Pal et al. | |
| 6,044,404 A | 3/2000 | Holdsworth et al. | |
| 6,219,675 B1 | 4/2001 | Pal et al. | |
| 6,301,616 B1 | 10/2001 | Pal et al. | |
| 6,418,438 B1 | 7/2002 | Campbell et al. | |
| 6,487,560 B1 * | 11/2002 | LaRue et al. ................... | 707/625 |
| 6,546,443 B1 | 4/2003 | Kakivaya et al. | |
| 6,950,834 B2 * | 9/2005 | Huras et al. ................... | 707/610 |
| 2002/0065968 A1 | 5/2002 | Bryant et al. | |

FOREIGN PATENT DOCUMENTS

WO WO97/35269 9/1997

OTHER PUBLICATIONS

Gopi K. Attaluri, Logical Concurrency Control for Large Objects in a Multidatabase System, IBM Centre for Advanced Studies Conference, Oct. 1993, pp. 860-872, IBM Press, Toronto, Ontario.
John Peif, et al., Real Time Resource Allocation in Distributed Systems, Annual ACM Symposium on Principles of Distributed Computing, 1982, pp. 84-94, ACM, Ottawa, Canada.
Andrea H. Skarra, et al., An Object Server for an Object-Oriented Database System, International Workshop on Object-Oriented Database Systems, 1986, pp. 196-204, IEEE, Pacific Grove, CA.
D. Motzkin, et al., On Concurrent Execution of Information Systems Applications, ACM-SAC '93, 1993, pp. 775-781, ACM, IN, USA.

(Continued)

*Primary Examiner* — Robert Beausoliel, Jr.
*Assistant Examiner* — Nirav K Khakhar
(74) *Attorney, Agent, or Firm* — Nicholas Chen; David Andrews; Micky Minhas

(57) ABSTRACT

Systems and methodologies are provided for efficiently performing concurrent transactions by multiple users, and tracking data at a logical level beneath a physical level of the object being modified. Each transaction can copy a committed version of the data segment to be modified to its respective space, and can update such copy during modification. A detect component detects whether any data segment being operated upon requires updating as a result of other transactions committing, and a merge component synchronizes the data segment with its committed version. Various optimization procedures can also be incorporated as part of the commit stage, upon completion of the detect and merge process.

18 Claims, 11 Drawing Sheets

(56) References Cited

OTHER PUBLICATIONS

Maher Suleiman, et al., Serialization of Concurrent Operations in a Distributed Collaborative Environment, Conference on Supporting Group Work, 1997, pp. 435-445, ACM. Phoenix. Arizona. USA.

Philip A. Bernstein, et al., Concurrency Control in Distributed Database Systems, Computing Surveys, 1981, pp. 185-221, vol. 13, No. 2, ACM.

Eric N. Hanson, Processing Queries Against Database Procedures: A Performance Analysis, International Conference on Management of Data, Jun. 1988, pp. 295-302, ACM.

Tatu Ylonen, Shadow Paging is Feasible, M.S. Thesis, 1995, pp. 1-16.

Junghoo Cho, et al., Synchronizing a Database to Improve Freshness, MOD 2000, 2000, pp. 117-128, ACM, Dallas, TX.

European Search Report dated Jun. 16, 2006 for European Patent Application Serial No. 05105303, 3 Pages.

T. Johnson, et al., "A Prioritized Multiprocessor Spin Lock", IEEE Transactions on Parallel and Distributed Systems, IEEE Service Center, Los Alamitos, CA, US, vol. 8, No. 9, Sep. 1997, pp. 926-933.

* cited by examiner

CONCURRENT TRANSACTIONS AND PAGE SYNCHRONIZATION

TECHNICAL FIELD

The present invention relates generally to data management, and more particularly to systems and methods of performing concurrent transactions that operate on a physical segment of data (e.g., at a sub page level of a database management system) via employing a page versioning/copying approach.

BACKGROUND OF THE INVENTION

Increasing advances in computer technology (e.g., microprocessor speed, memory capacity, data transfer bandwidth, software functionality, and the like) have generally contributed to increased computer application in various industries. Ever more powerful server systems, which are often configured as an array of servers, are often provided to service requests originating from external sources such as the World Wide Web, for example. As local Intranet systems have become more sophisticated thereby requiring servicing of larger network loads and related applications, internal system demands have grown accordingly as well.

Typically, a problem in computer systems has been handling the growing amount of information or data available, and continuously monitoring updates entered by a plurality of users. The sheer amount of information being stored on disks or other media for databases in some form has been increasing dramatically. While files and disks were measured in thousands of bytes a few decades ago—at that time being millions of bytes (megabytes), followed by billions of bytes (gigabytes)—now databases of a million megabytes (terabytes) and even billions of megabytes are being created and employed in day-to-day activities.

As such, much business data is stored in databases, under the management of a database management system (DBMS). For such DBMS systems, a demand for database transaction processing capacity in large installations has been growing significantly. At the same time, a large percentage of overall new database applications have been in a relational database environment. Such relational database can further provide an ideal environment for supporting various forms of queries on the database. For example, a growth in the use of ad hoc unstructured concomitant queries—is a trend that is expected to accelerate in such database environments. This can result in a growing requirement for simultaneously supporting both high volume transaction processing and unstructured queries against the same database. Thus, systems and methodologies that can effectively support both high volume transactions and complex queries, with minimal interference between the two, while sharing copies of data are in demand.

Typically, business entities create and maintain their databases through a high volume of relatively simple transactions, with an essential function of a database engine being able to execute a plurality of such transactions concurrently. Each of such plurality of transactions can be considered a piece of work, which can further consist of a sequence of operations such as, read, write, update, and/or delete, against a database. Such transaction can represent well-understood business operations (e.g., creating a new customer record, noting an account payment or transfer, and the like). Increasingly enterprises are becoming interested in running more ad hoc unstructured queries against their online data. As such, a measure of the correctness of the state of the database or a database's integrity becomes increasingly vital.

In general database integrity can refer to the problem of ensuring that two or more concurrently executing transactions do not interfere with each other in such a manner as to produce an incorrect state in the database. An application programmer typically should ensure that each transaction produces a correct state, and that each transaction begins when the database is in a correct state. Such transaction management should generally adhere to the ACID (Atomicity, Consistency, Isolation and Durability) standards. Yet, when multiple copies of data pages are created, such standards can be difficult to adhere to. At the same time, the more efficiently a database engine supports concurrent transactions, the better an end-user experience can be in terms of speed of operation and reduced database growth.

In particular, conventional shadow paging techniques do not typically provide for efficient operations during a commit stage of data modifications, and can require additional over head for merging purposes of concurrent transactions. Moreover, employing log records can in general add to the complexity of the database management and recovery.

Therefore, there is a need to overcome the aforementioned deficiencies associated with conventional systems and methodologies related to database operations and in general to any data management system accepting data entry from multiple users.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The present invention provides for systems and methods of executing concurrent transactions by employing a versioning/copying approach, wherein a detect component detects whether any data segment being operated upon requires an updating due to other transactions committing, and a merge component that synchronizes the data segment with its committed version. The data segment can be a physical unit and/or an exchange unit of data shared among multiple transactions, such as a data page in a database. Accordingly, concurrent transactions can operate on various copies of a data page, with each transaction modifying its respective copy of the data page, thus facilitating multiple user operation. It is to be appreciated that although the present invention is primarily described in the context of database transactions, the invention is not so limited and can be applied to any data management system, wherein tracking data at a logical level beneath a physical level of the object being modified is desired.

According to a methodology of the present invention, a transaction $T_1$ requiring a modification of a data page at a sub page level, initially copies a latest committed version ("golden copy") of the data page from the data base into its own space. Upon grant of proper locks for modifying the required sub page level (e.g., a row level) the transaction $T_1$ initiates required modification on the copied replica. In the mean time, various other transactions modifying other segments of the same page (e.g., other rows not locked by $T_1$) can commit, thus changing the "golden copy" of the data page that is concurrently being modified by $T_1$. Before $T_1$ commits, the present invention detects such changes to the "golden copy" and merges the changes with $T_1$'s own modification, such that at a commit stage a consistency of the database is maintained. Accordingly, earlier copies of the golden copy are updated and/or synchronized with later modifications thereto. Also, for re-read operations, (for example if a read of the page that $T_1$ has been modifying becomes necessary), any changes to the golden copy of the page should be merged into transaction's space, so that a proper read-committed version of such page is employed for the re-read process. Moreover, if a decision is made for transaction $T_1$ not to commit, then the copy of the page modified by $T_1$ is simply discarded.

In a related aspect of the present invention a page marking component can be provided that notifies transactions of changes to the golden copy(ies). Information about pages on which each transaction is operating can be stored in the data base engine, and as a transaction commits, information about the committed version are provided to other transactions as required. As such, if concurrent transactions are operating on different pages, then typically no merging step is required and the page marking component need not provide information to other transactions for reconciliation with the latest committed version of a page. Similarly, if a transaction rolls back and no commit is performed, a page marking of other transactions is in general not required.

According to a further aspect of the present invention, various optimization features can be introduced to efficiently perform the merge process. For example, conditions can be enforced such that prior to a commit stage of a transaction (e.g., before "hardening" the modifications made by the transaction into a database) a space availability for a particular page can be typically assured (e.g., that transactions operating on various copies of the page do not consume all of storage space on that page), and reorganization of data around the page is mitigated (e.g., that a transaction need not move data around the page for purpose of merging various copies.) Such framework enables a commit operation to occur with efficiency and simplicity, thus improving multi user operation and conserving system resources.

In a related aspect of the present invention, a spin lock system can be provided that enables a mechanism for only one user to commit at a time. Such mutex component can typically be employed at the time a transaction has reached a commit stage to provide consistency in database operation.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
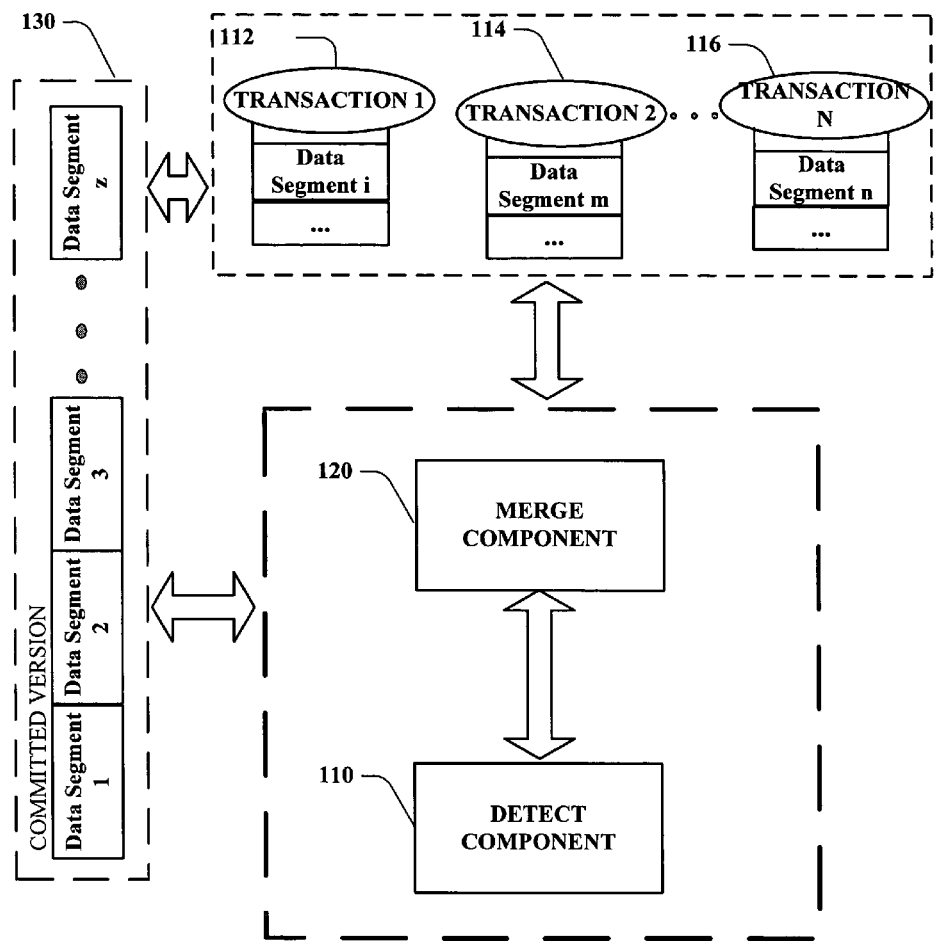
FIG. 1 is a block diagram for parts of a data management engine, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

The present invention provides for systems and methods that employ a detect component and a merge component to provide for executing concurrent transactions on predefined data segments (e.g., at a sub page level in databases). Each transaction copies the data segment at its latest committed version ("golden copy") from the data storage into the transaction's own space. The detect component can detect whether any data segment being operated upon requires updating based on further modifications performed thereto by other transactions. It is to be appreciated that although the present invention is primarily described in the context of database transactions, the invention is not so limited and can be applied to any data management system, wherein multiple users require changes to data segments of a data storage space.

Referring initially to FIG. 1, an exemplary part of a data management engine in accordance with an aspect of the present invention is illustrated that incorporates a detect component 110 and a merge component 120, with transactions 112 thru 116 operating thereon. Each of the transactions 112 thru 116 can operate on its respective copy of a data segment (e.g., copies of data page(s) form a data base) that is being copied from a committed version 130 of data segment (i, m, n and z being integers), in addition to any data segment created by the transaction. Such operations can for example include row level manipulation of data in each page of a data base. Typically, the data management engine of the present invention can be a multiple user engine that can further enable a plurality of users to simultaneously perform operations in a data storage (not shown) of data segments. Should a transaction require modifying data in a data segment, initially the data segment can be copied to a space reserved for that transaction. Thereafter, the transaction can operate on such copied data segment and modify required data.

The detect component 110 can operate across the plurality of concurrent transactions 112 thru 116 to detect whether any of the data segments copied from the shared data segment's committed version ("golden copy") 130 requires an update. Such update can for example be required when after a transaction $T_1$ copies a data segment from its latest committed version (the golden copy), another transaction commits on the data segment, and hence modifies the golden copy. In order to maintain a consistent state of the data segment storage space, transaction $T_1$ now needs to be updated to reflect such changes to the to the golden copy, which is due to another transaction committing. Such update can be provided by the merge component that can operate across the plurality of concurrent transactions 112, 114 and 116, with N being an integer.

For example, at any given time the multiple transactions 1 to N (N being an integer) can desire a modification to a particular data segment of the data storage space. Such modifications can include change of data at a particular slot, insertions of data fields, deletion of data field and the like. A transaction can then copy the data segment to a reserved space, with each transaction inserting rows or deleting rows in its respective copy of that data page. Accordingly, the detect component 110 can then detect a change that occurs on the golden copies of a particular data segment, and in combination with the merge component 120 operate such that prior to a commit stage of a transaction the page to be committed is properly updated.

Figure 2:
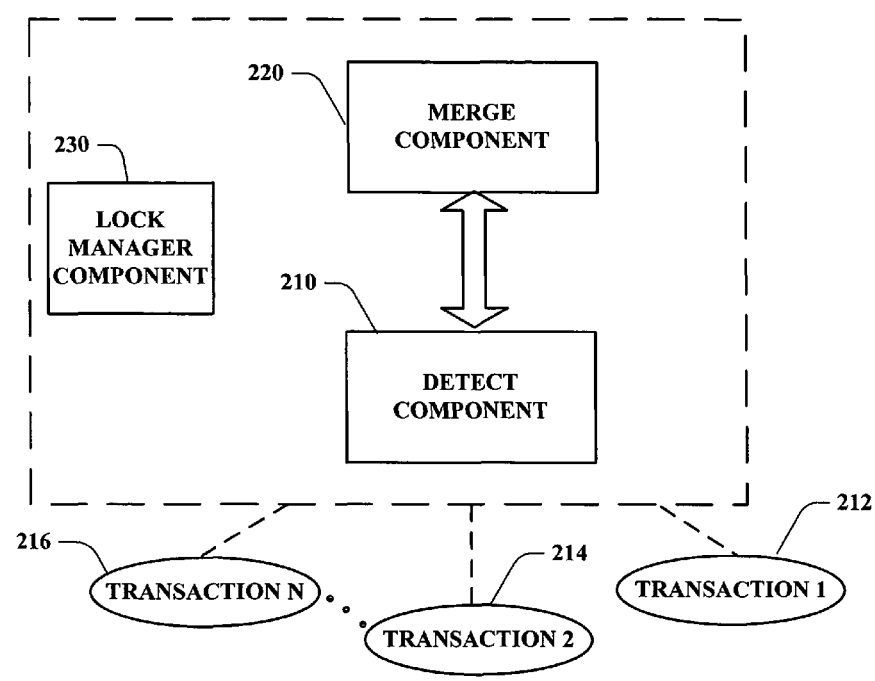
FIG. 2 is a block diagram of data base engine operating as part of a database environment having a lock manager in accordance with an aspect of the present invention.

FIG. 2 illustrates exemplary aspects for parts of a data base engine that interact with a lock manger 230, in accordance with a particular aspect of the present invention. The lock manager 230 can determine whether a lock on a particular resource can be granted, and is typically well suited to administer sub-page locking (e.g., row level locking), as each transaction T1 to Tn can operate on its respective copy of a data page. Since many copies of the data page can exist at any given time, the lock manager 230 can typically assure that concurrent transaction can modify information in a same data page, albeit at different rows. For example, lock manager 230 can grant an exclusive lock for a particular row to a transaction, and other transactions would then be restricted to modify such row, even though modifications to other rows can still be permitted. Thus, based on a normal concurrency of operations, the lock manager 230 can grant or deny a lock to a particular resource.

According to one particular aspect of the present invention, the lock manger 230 can be independent of the detect component 210 and the merge component 220 of the database engine. In a related aspect, extra information is stored in the lock manager (e.g., grant of exclusive locks at particular locations, empty space availability, and the like) and can be employed by the detect component 210 to track which transaction 212-216 is working on which golden copy of the data base. Accordingly, since modifications by various transactions on a data page occur on separate copies of the data page, the detector component 210 in conjunction with the merge component 220 can enable a preservation of ACID properties for transactions 212-216, while the lock manager 230 can typically assure that logically a transaction is permitted to modify a particular resource. This facilitates operations of concurrent transactions at a subpage level (e.g., a row level), during modifications of a data base by multiple users. In addition, during a read operation of a data page (e.g., when no modification to a data page is required) there will typically be no requirement to request shared locks as a read can be requested from a committed state of the data page. Furthermore if a read operation is required by a transaction that has a copy of any data pages, then the read operation will again not require shared locks, as a read can be achieved using the committed pages and/or the transactions version of any pages, (typically the transaction's pages can be used in preference to the committed pages, provided that the page is not modified elsewhere.

Figure 3:
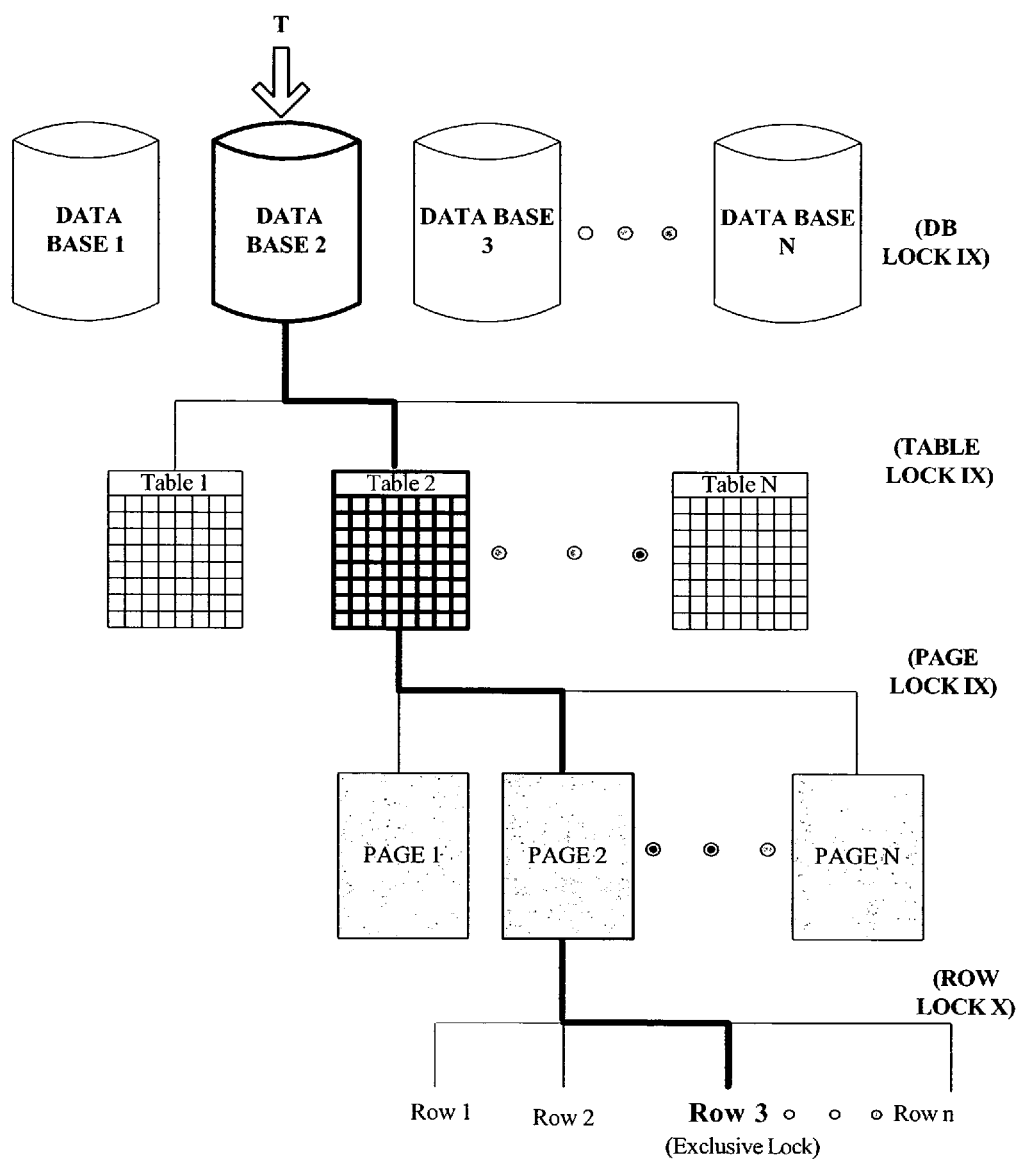
FIG. 3 illustrates an exemplary lock hierarchy administered by the lock manager according to another aspect of the present invention.

FIG. 3 illustrates an exemplary lock hierarchy granted by the lock manager 230. As illustrated in the lock granularity, an exclusive lock has been granted for transaction T that requests a modification on row 3 on data page 2 of table 2, of data base 2. As such, a copy of data page 2 can be copied to a reserved space (not shown) of transaction T, and transaction T can then proceed with its modification. Such exclusive lock grant to row 3 can be visible to other transactions, and typically no other transaction can modify such row on its respective copy of data page 2, until T commits (or rolls back) its modification and the lock is released.

Figure 4:
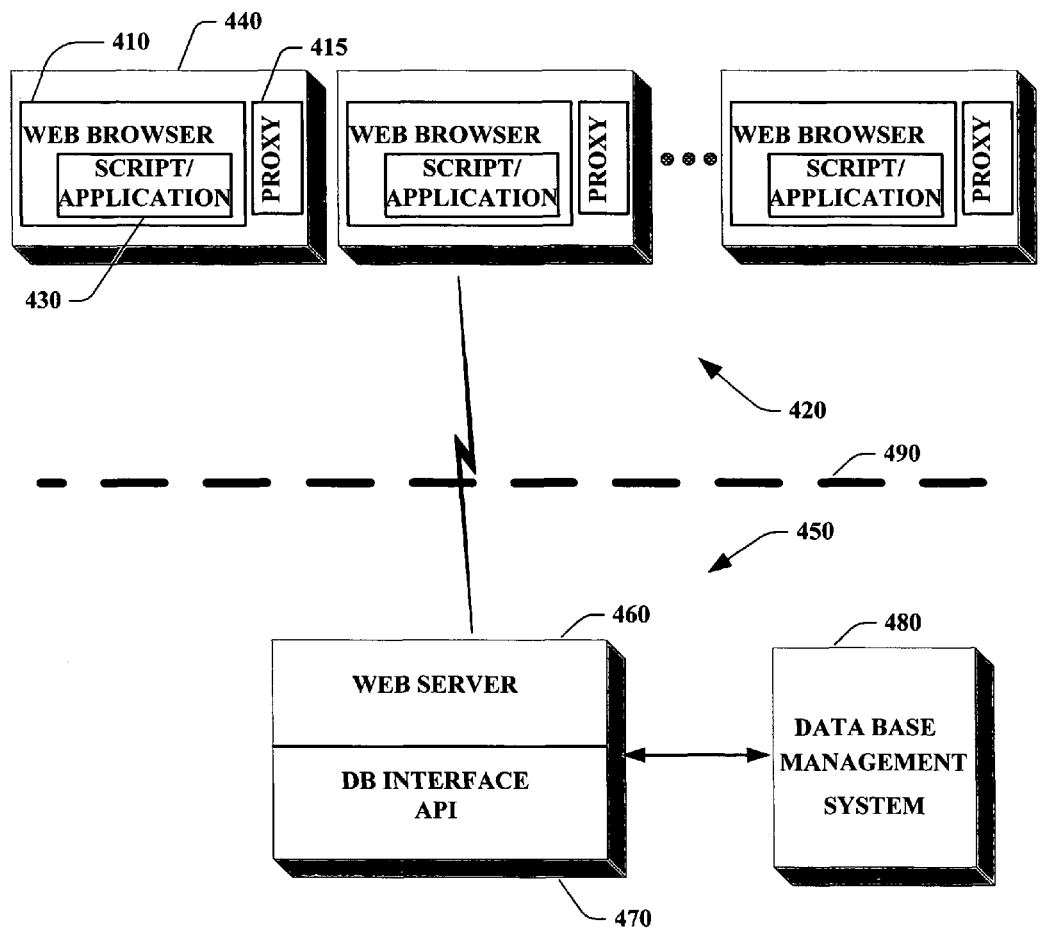
FIG. 4 illustrates a block diagram of a client server network that employs concurrent transactions in accordance with an aspect of the present invention.

FIG. 4 illustrates a plurality of clients that request modification to a data base in accordance with an aspect of the present invention, wherein running on each of the client 420 can be a client process, for example, a web browser 410. Likewise, running on the server 450 can be a corresponding server process, for example, a web server 460. In addition, embedded in the Web Browser 410 can be a script or application 430, and running within the run-time environment 440 of the client computer 420, can exist a proxy 415 for packaging and unpacking data packets formatted. Communicating with the server 450 is a database management system (DBMS) 480, which manages access to a database (not shown). The DBMS 480 and the database (not shown) can be located in the server itself, or can be located remotely on a remote database server (not shown). Running on the Web server 460 is a database interface Applications Programming Interface (API) 470, which provides access to the DBMS 480. The client computer 420 and the server computer 450 can communicate with each other through a network 490. It is to be appreciated that other arrangements are also possible, for example the client computer and the server computer being the same computer. When the client process, e.g., the Web browser 410, requests data from a database, the script or application 430 issues a query, which is sent across the network (e.g. internet) 490 to the server computer 450, where it is interpreted by the server process, e.g., the Web server 460. The client's 420 request to server 450 can contain multiple commands, and a response from server 450 can return a plurality of result sets.

In such communication, session, presentation, and application service elements can be provided by Tabular Data Stream (TDS). Since TDS does not require any specific transport provider, it can be implemented over multiple transport protocols and the network 490. Responses to client commands that are returned can be self-describing, and record oriented; (e.g., the data streams can describe names, types and optional descriptions of rows being returned.)

On the client side 420 the data can be a Structured Query Language (SQL) command being in a language that the server side 450 can accept, a SQL command followed by its associated binary data (e.g., the data for a bulk copy command), or an attention signal. When a connection is desired, the client 420 can send a connection signal to the server. Even though the client 420 can have more than one connection to the server 450, each connection path can be established separately and in the same manner.

Once the server 450 has received the connection signal from the client 420 it will notify the client that it has either accepted or rejected the connection request. Likewise to send SQL command or batch of SQL commands; then the SQL command (e.g., represented by a Unicode format) can be copied into the data section of a buffer and then sent to the SQL Server side 450. In addition, various Open Data Base Connectivity (ODBC) routines can cause SQL command to be placed into a client message buffer, or can cause the message buffer to be sent to the server. Once a modification is desired and prior to a commit stage of a transaction, a space availability for a particular page can be typically assured (e.g., that transactions operating on various copies of the page do not consume all of storage space on that page), and reorganization of data around the page can be mitigated (e.g., that a transaction need not move data around the page for purpose of merging various copies.) Such framework enables a commit operation to occur with efficiency and simplicity, thus improving multi user operation and conserving system resources.

Figure 5:
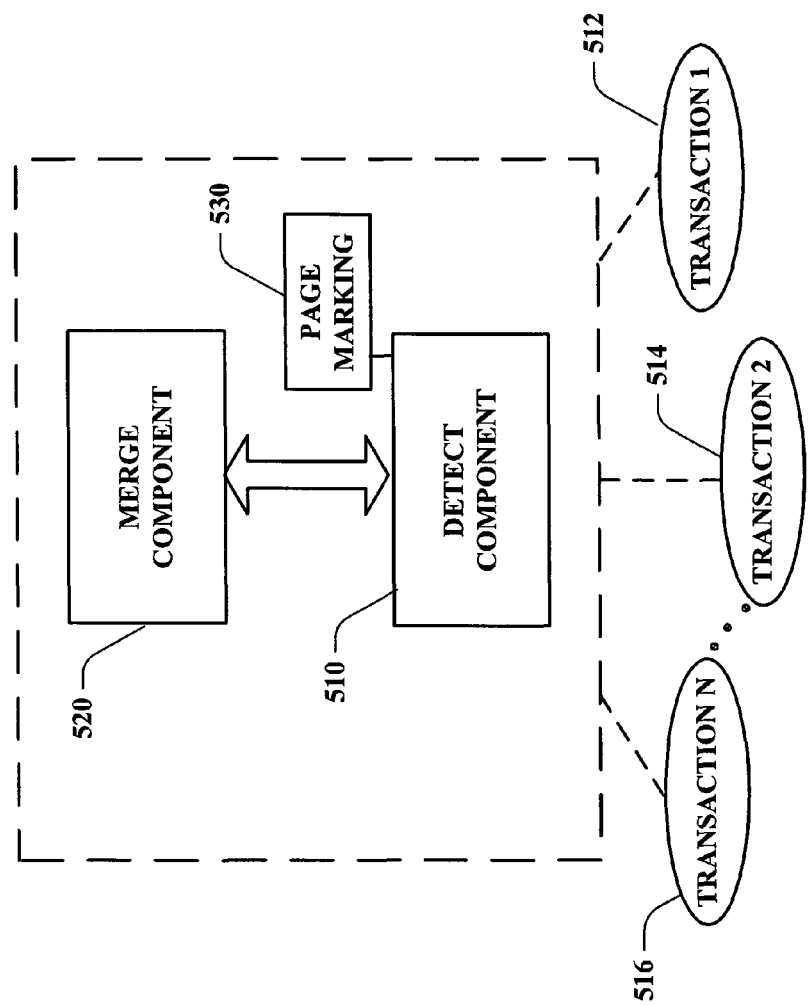
FIG. 5 is a block diagram for parts of a data base engine with a page marking component in accordance with an aspect of the present invention.

FIG. 5 illustrates a schematic block diagram for parts of a database engine according to one aspect of the present invention that further incorporates a page marking component 530. Typically, when a transaction $T_1$ is operating on a particular page, transaction $T_1$ must be able to detect whether there has been a change to the golden copy of that page, after copying by $T_1$. In one aspect according to the present invention such detection is facilitated via a page marking component 530 that operates in conjunction with the detect component 510. The page marking component 530 can notify transactions of changes to the golden copy(ies). Information about pages on which each transaction is operating can be stored in the data base engine, and as a transaction commits, information about the committed version are provided to other transactions as required. Thus, if concurrent transactions are operating on different pages, then no merging step is required and the page marking component typically need not provide information to other transactions for reconciliation with the latest committed version of a page. Similarly, if a transaction rolls back and no commit is performed a page marking of other transactions is in general not required.

Accordingly, when transaction $T_1$ commits, a determination is made as to what effect that can have on other transactions—for example, another transaction $T_2$ can be operating on another copy of the same page that $T_1$ has modified, and if so, a mark can be assigned to the copy that $T_2$ is operating thereon. Information about pages on which each of the transactions 512-516 is operating can be stored in the database engine. Before transaction 512 commits its update, it is checked to see whether a merging is required. Such can be accomplished by checking an associated mark assigned by the page marking component, and/or by checking whether other transactions have modified the same page. As such, if concurrent transactions 512-516 operate on different pages, then a merge step is typically not required. Likewise, if any of transactions 512-516 is required to roll back, then the respective page copy is simply discarded, yet other transactions paged marked by such transaction, (which is now rolled back), can still perform the merge with the committed version.

Figure 6:
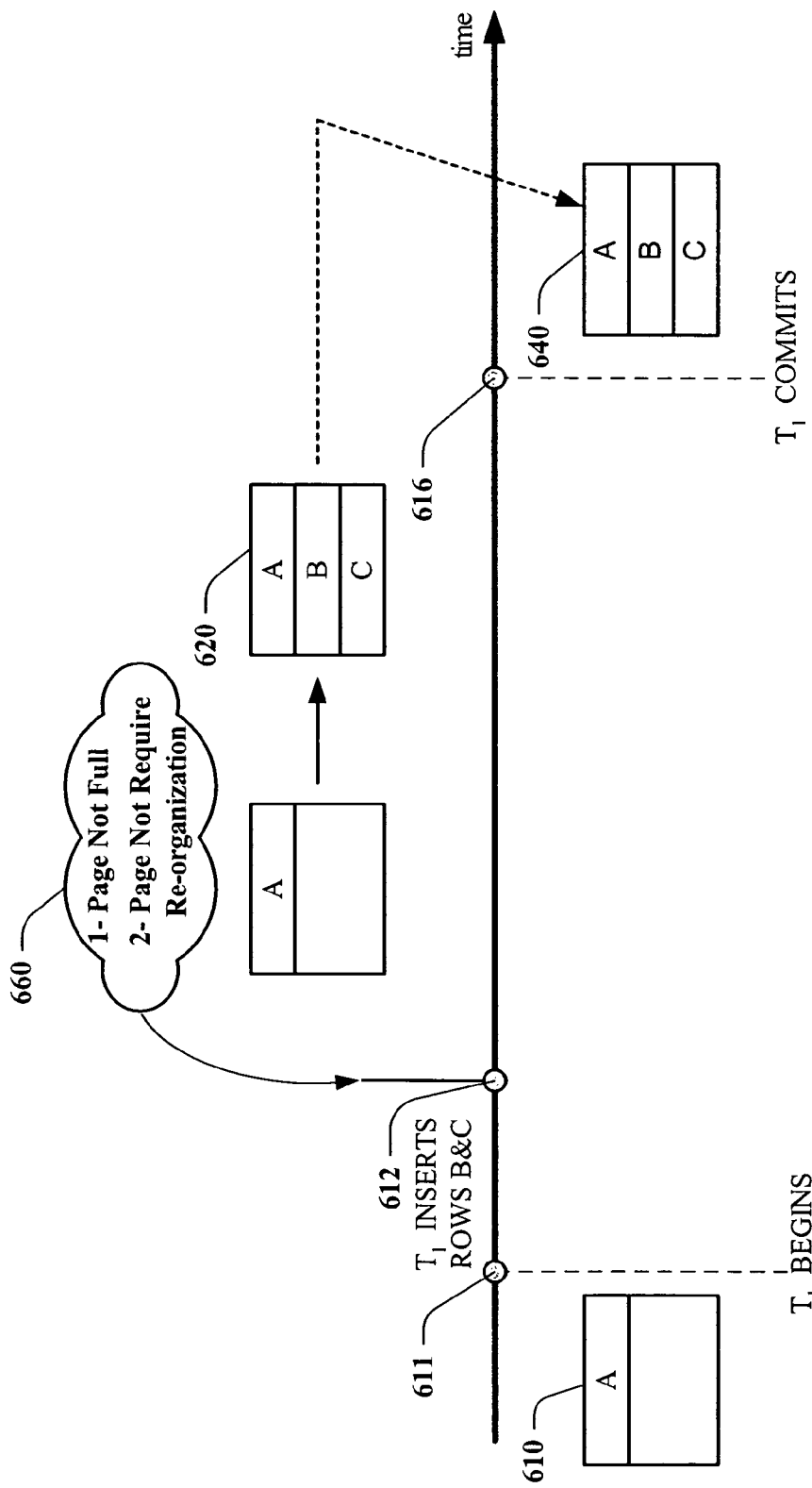
FIG. 6 illustrates a particular methodology according to one aspect of the present invention.

FIG. 6 illustrates an optimization feature that can be employed in conjunction with the merge process of the present invention. Concurrent transaction $T_1$ can operate on a copy of data page 610. The data page 610 (golden page) initially contains row A. At 611 $T_1$ begins operation on a copy of data page 610, in order to insert rows B and C at 612. Prior to such insert operation at 612, an optimization feature can be introduced to check and/or enforce two conditions 660, namely; availability of space on the page (page not being full), and page not requiring reorganization, due to other transactions modifying such page. As such, space consumed on a data page and a space available thereon can be determined prior to an insert operation and/or selection of the page for operating thereon (e.g., a determination can be made whether there is sufficient space available to perform a modification even before a copying of such page.) Thus, in addition to logical considerations for sub page modifications (e.g., whether there is logical permission to insert a row at a particular location), the optimization feature for the present invention can also consider the physical properties of that page (e.g., whether there is space available on a particular page at time of insertion.) Subsequently, rows B and C are inserted at 612. Such insertions of rows B and C can occupy the available space on such data page copy, as depicted at 620. $T_1$'s commit operation 616 thus occurs with efficiency and simplicity, while at the same time improving multi user operation and conserving system resources. While the optimization feature described supra is not necessary for practicing other aspects of the present invention, it serves to improve performance. In particular, non-compliance with the "page not full" condition can typically require the database engine to find another page on which to store data. In a related aspect, should $T_1$ roll back its modifications and free up space on the data page, the availability of such additional space can be indicated across all transactions. The roll back can also discard associated locks (e.g. exclusive row locks), such that earlier stored information on space that was to be consumed by the now rolled back transaction, is discarded simultaneously with elimination of the associated locks.

Figure 7:
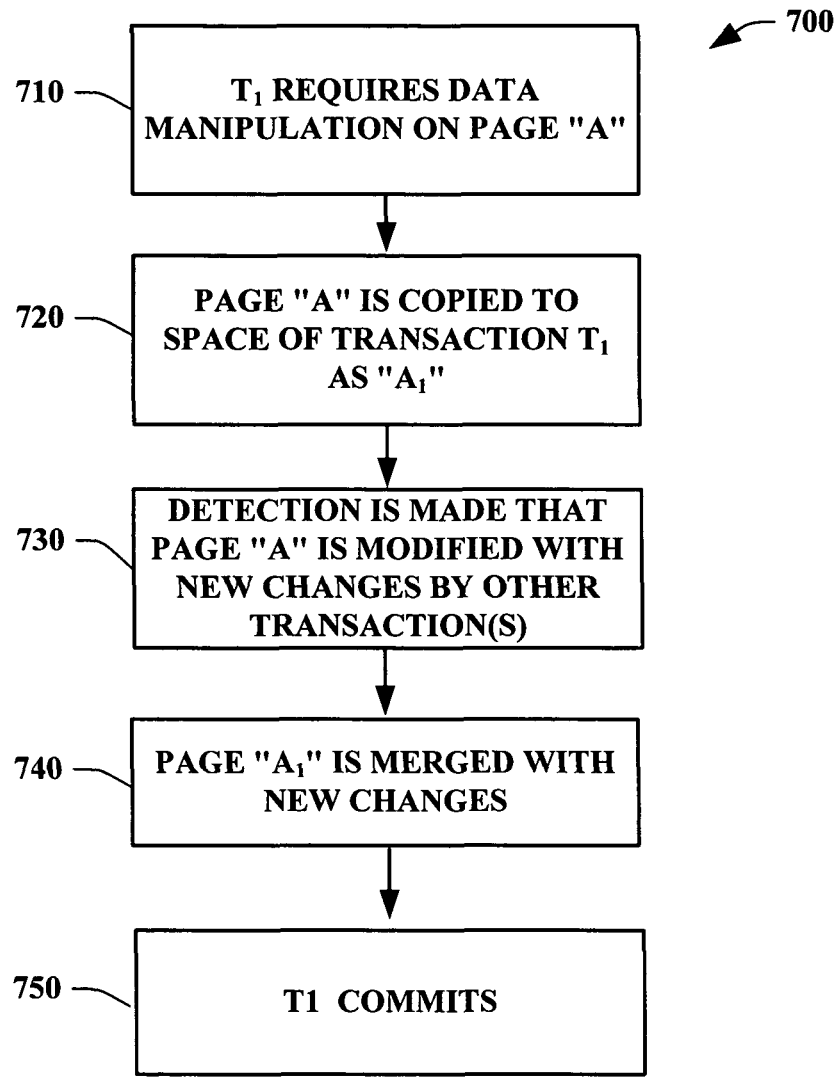
FIG. 7 is an exemplary methodology according to another aspect of the present invention.

FIG. 7 illustrates an exemplary methodology according to one aspect of the present invention. The methodology 700 initiates with transaction $T_1$ requesting modification of data from a data storage area, for example modification at a sub page level of a data page "A" in a data base. In the particular example of the database environment, transaction $T_1$ can be part of a plurality of concurrent transactions that are operating as part of a multiple user database engine. The request for data manipulation by transaction $T_1$ at 710 can include change of data at a particular slot, replacing a row with an updated row, insertions of rows, deletion of rows and the like, on a particular data page. Transaction $T_1$ can then copy the data page "A" at 720, to a reserved space, as copy $A_1$. At 730, detection made is that the golden copy of data page "A" has been modified by other transactions. Such detection can for example be made by the detect component and page $A_1$ be marked by the page marking component, with a merge requirement. Subsequently, at 740 page $A_1$ is merged and updated with the new changes to the committed copy. Transaction $T_1$ can then commit, while maintaining a consistency of the database, and with no loss of data therein.

Figure 8:
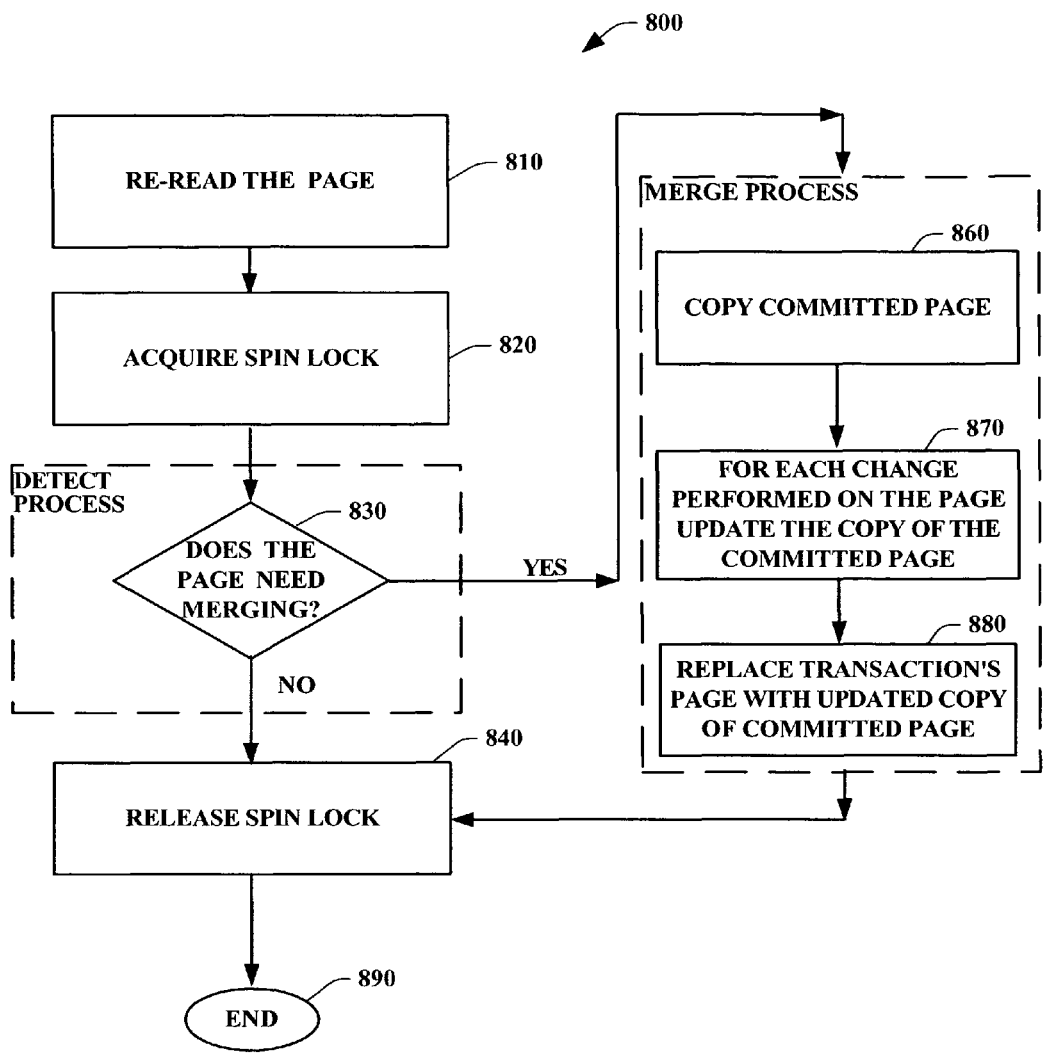
FIG. 8 illustrates an exemplary flow chart for a detect and merge methodology in accordance with an aspect of the present invention.

FIG. 8 illustrates a related methodology according to one aspect of the present invention, wherein a transaction is required to re-read a data page at 810, in accordance with an aspect of the present invention. Such re-read can occur, for example, when the transaction performs a "SELECT" operation over the same data more than once during a life time of the transaction—with the transaction operating at a read committed isolation level. At 820 a spin lock is acquired that enables a mechanism for only one transaction to merge at any one time. Such mutex component can be employed to typically assure consistency in database operation. At 830 a determination is made by the detect methodology as to whether the page needs merging with new changes made to the "golden copy" of the data page, which can be shared among the plurality of concurrent transactions. If not, the spin lock is released at 840, and the operation ends at 890. On the other hand, if a determination is made that there is a requirement for merging of the page, then the methodology proceeds to the merge process and the committed version of the page is then copied to the respective space of the transaction at 860. Subsequently, and as an additional part of the merge process, for each change performed on the page, the associated committed page is updated at 870. The transaction's page is then replaced with updated copy of committed page, at 880.

Figure 9:
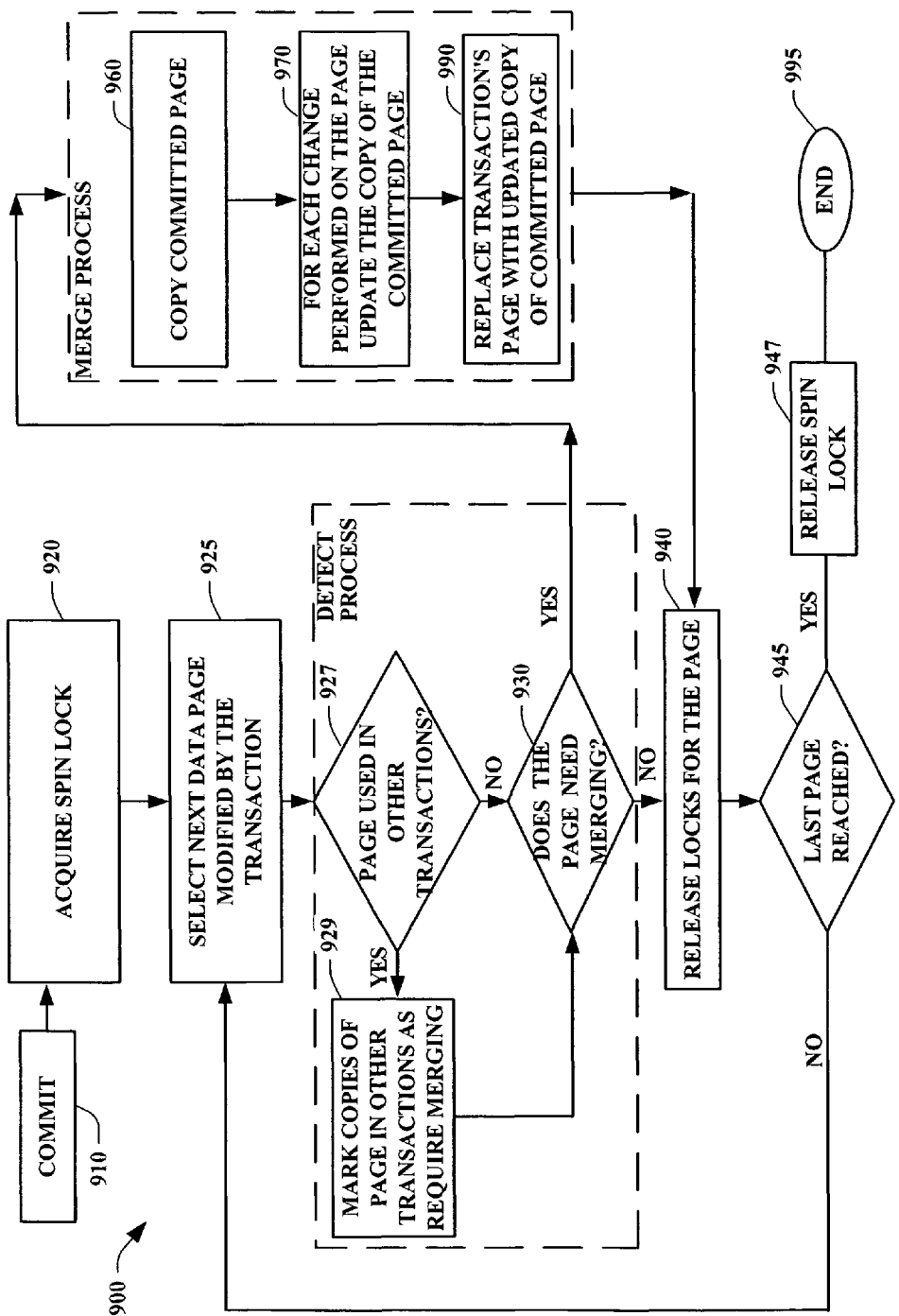
FIG. 9 illustrates another exemplary methodology for a detect and merge process as part of a commit stage in accordance with an aspect of the present invention.

Now referring to FIG. 9, a related methodology according to one aspect of the present invention is illustrated, wherein detecting and merging the changes as part of the commit procedure 910 is outlined. At 920 a spin lock is acquired that enables a mechanism for only one user to commit at a time, and assures consistency in database operation. At 925 a next data page that has been modified by the transaction is selected for the detect and merge process. Subsequently, the detect process is initiated, and at 927 a determination is made whether the page is being employed by other transactions. If so, the methodology proceeds to 929 wherein copies of such page employed by other transactions are marked for merging, for example via the page marking component as described in detail supra. Otherwise, at 930 a determination is made through the detect methodology as to whether the page needs merging with new changes made to the "golden copy" of the data page that can be shared among the plurality of concurrent transactions. If there is a requirement for merging of the page, then the methodology proceeds to the merge process and the committed version of the page is then copied to the respective space of the transaction at 960. Subsequently, and as an additional part of the merge process, for each change performed on the page, the associated committed page is updated at 970. The transaction's page is then replaced with updated copy of committed page, at 990, and follows a release of the locks at 940. On the other hand, if at 930 a determination is made that there is no requirement for merging the page, the methodology proceeds directly to release of the locks for the page at 940. Subsequently, a determination is made whether the last page operated upon by the transaction is reached, at 945. If not the operation loops back to step 925, otherwise the operation releases the spin lock at 947 and ends at 995.

Figure 10:
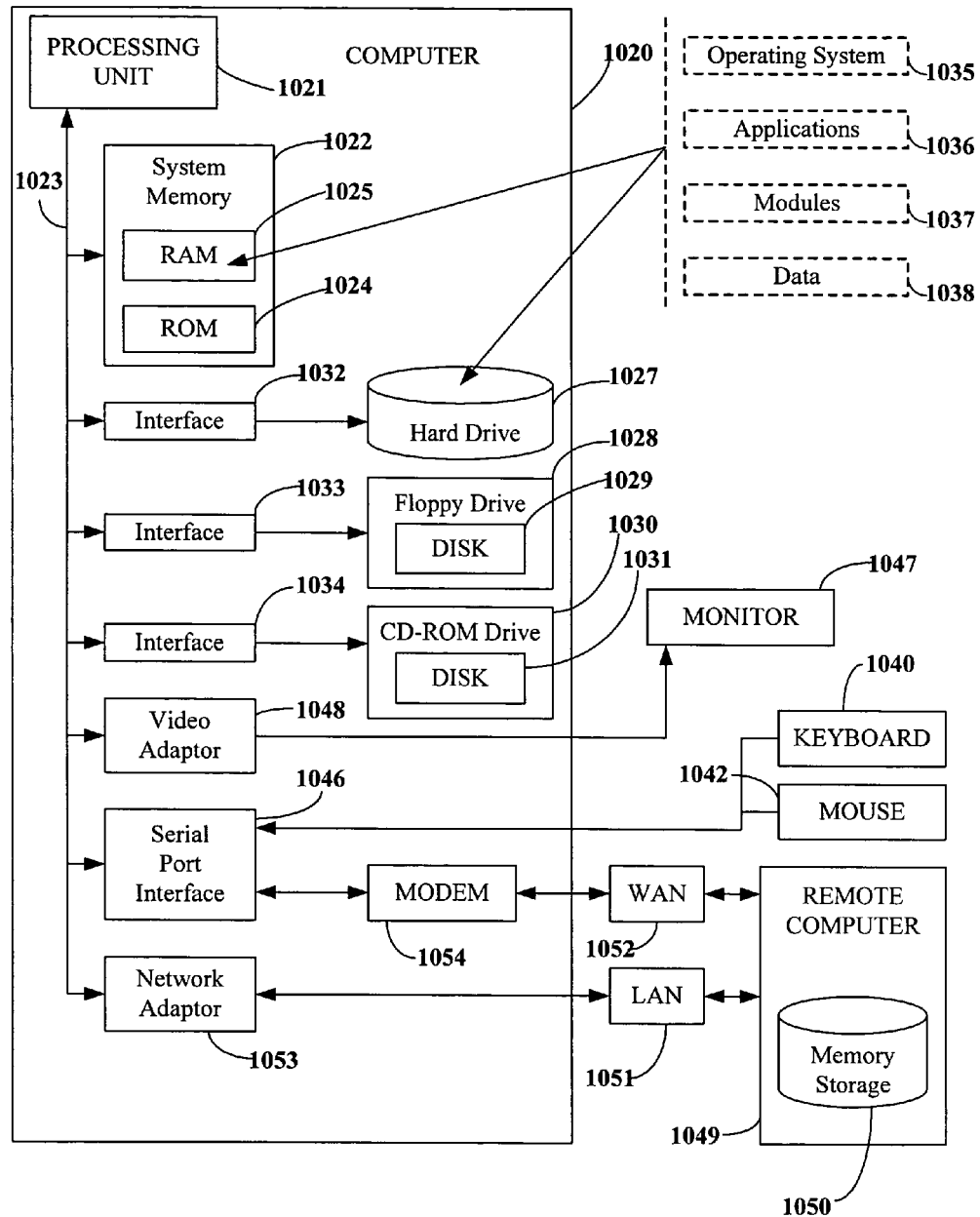
FIG. 10 is a schematic block diagram illustrating a suitable computing environment that can employ various aspects of the present invention.

Referring now to FIG. 10, a brief, general description of a suitable computing environment on the client as well as the server side is illustrated wherein the various aspects of the present invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary includes a computer 1020, including a processing unit 1021, a system memory 1022, and a system bus 1023 that couples various system components including the system memory to the processing unit 1021. The processing unit 1021 may be any of various commercially available processors. Dual microprocessors and other multi-processor architectures also can be used as the processing unit 1021.

The system bus may be any of several types of bus structure including a memory bus or memory controller, a peripheral bus, and a local bus using any of a variety of commercially available bus architectures. The system memory may include read only memory (ROM) 1024 and random access memory (RAM) 1025. A basic input/output system (BIOS), containing the basic routines that help to transfer information between elements within the computer 1020, such as during start-up, is stored in ROM 1024.

The computer 1020 further includes a hard disk drive 1027, a magnetic disk drive 1028, e.g., to read from or write to a removable disk 1029, and an optical disk drive 1030, e.g., for reading from or writing to a CD-ROM disk 1031 or to read from or write to other optical media. The hard disk drive 1027, magnetic disk drive 1028, and optical disk drive 1030 are connected to the system bus 1023 by a hard disk drive interface 1032, a magnetic disk drive interface 1033, and an optical drive interface 1034, respectively. The drives and their associated computer-readable media provide nonvolatile storage of data, data structures, computer-executable instructions, etc. for the computer 1020. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the present invention.

A number of program modules can be stored in the drives and RAM 1025, including an operating system 1035, one or more application programs 1036, other program modules 1037, and program data 1038. The operating system 1035 in the illustrated computer can be substantially any commercially available operating system.

A user can enter commands and information into the computer 1020 through a keyboard 1040 and a pointing device, such as a mouse 1042. Other input devices (not shown) can include a microphone, a joystick, a game pad, a satellite dish, a scanner, or the like. These and other input devices are often connected to the processing unit 1021 through a serial port interface 1046 that is coupled to the system bus, but may be connected by other interfaces, such as a parallel port, a game port or a universal serial bus (USB). A monitor 1047 or other type of display device is also connected to the system bus 1023 via an interface, such as a video adapter 1048. In addition to the monitor, computers typically include other peripheral output devices (not shown), such as speakers and printers.

The computer 1020 can operate in a networked environment using logical connections to one or more remote computers, such as a remote computer 1049. The remote computer 1049 may be a workstation, a server computer, a router, a peer device or other common network node, and typically includes many or all of the elements described relative to the computer 1020, although only a memory storage device 1050 is illustrated in FIG. 10. The logical connections depicted in FIG. 10 may include a local area network (LAN) 1051 and a wide area network (WAN) 1052. Such networking environments are commonplace in offices, enterprise-wide computer networks, Intranets and the Internet.

When employed in a LAN networking environment, the computer 1020 can be connected to the local network 1051 through a network interface or adapter 1053. When utilized in a WAN networking environment, the computer 1020 generally can include a modem 1054, and/or is connected to a communications server on the LAN, and/or has other means for establishing communications over the wide area network 1052, such as the Internet. The modem 1054, which can be internal or external, can be connected to the system bus 1023 via the serial port interface 1046. In a networked environment, program modules depicted relative to the computer 1020, or portions thereof, can be stored in the remote memory storage device. It will be appreciated that the network connections shown are exemplary and other means of establishing a communications link between the computers can be employed.

In accordance with the practices of persons skilled in the art of computer programming, the present invention has been described with reference to acts and symbolic representations of operations that are performed by a computer, such as the computer 1020, unless otherwise indicated. Such acts and operations are sometimes referred to as being computer-executed. It will be appreciated that the acts and symbolically represented operations include the manipulation by the processing unit 1021 of electrical signals representing data bits which causes a resulting transformation or reduction of the electrical signal representation, and the maintenance of data bits at memory locations in the memory system (including the system memory 1022, hard drive 1027, floppy disks 1029, and CD-ROM 1031) to thereby reconfigure or otherwise alter the computer system's operation, as well as other processing of signals. The memory locations wherein such data bits are maintained are physical locations that have particular electrical, magnetic, or optical properties corresponding to the data bits.

Figure 11:
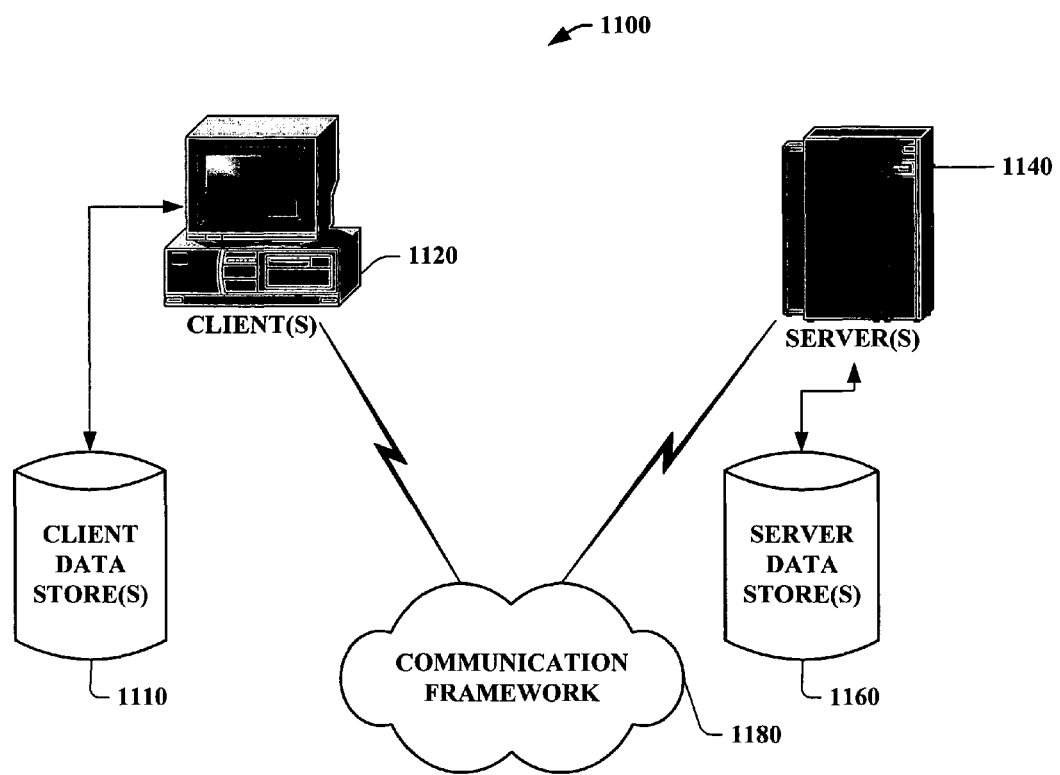
FIG. 11 illustrates a client—server system that can employ a data modification methodology according to one aspect of the present invention.

Referring now to FIG. 11, a client—server system 1100 that employs a data manipulation methodology according to one aspect of the present invention is illustrated. The client(s) 1120 can be hardware and/or software (e.g., threads, processes, computing devices). The system 1100 also includes one or more server(s) 1140. The server(s) 1140 can also be hardware and/or software (e.g., threads, processes, computing devices). For example, such servers 1140 can house threads to perform transformations by employing the present invention. The client 1120 and the server 1140 can communicate, in the form of data packets transmitted according to the present invention, between two or more computer processes. The client/server can also share the same process. As illustrated, the system 1100 includes a communication framework 1180 that can facilitate communications between the client(s) 1120 and the server(s) 1140. The client(s) 1120 is operationally connected to one or more client data store(s) 1110 that can store information local to the client(s) 1120. Moreover, client 1120 can access and update databases 1160 located on a server computer 1140 running a server process. In one aspect of the present invention, the communication frame work 1180 can be the internet, with the client process being a Web browser and the server process being a Web server. As such, a typical client 1120 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 1140 can be university or corporate mainframe computers, or dedicated workstations, and the like.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A computer system, comprising:
   one or more processors; and
   one or more computer readable media having stored thereon computer executable instructions which when executed by the one or more processors perform the following:
   creating a first copy of at least one data segment of a committed version of a data page for access by a first transaction;
   creating a second copy of the at least one data segment of the committed version of the data page for access by a second transaction;
   applying, by the first transaction, a change to the first copy of the at least one data segment;
   committing, by the first transaction, the change to the first copy of the at least one data segment to the committed version of the data page, causing the at least one data segment of the committed version of the data page to be updated with the change; and
   based on the first transaction committing the change to the first copy of the at least one data segment:
   detecting that the second copy the at least one data segment should be automatically updated in order to preserve atomicity, consistency, isolation, and durability standards of the second transaction; and automatically updating the second copy the at least one data segment with the at least one data segment of the committed version of the data page that has been updated with the change by the first transaction.

2. The computer system of claim 1, wherein the computer executable instructions further perform locking a portion of the committed data page where the one or more changes are to be made by either the first or the second transaction.

3. The computer system of claim 2, wherein a row level of the data page is locked.

4. The computer system of claim 1, wherein the computer executable instructions further perform:
tracking available space of the committed data page; and
determining whether any change made by the first and second transactions will exceed the available space prior to committing the first and second transactions.

5. The computer system of claim 1, wherein the computer executable instructions further perform:
maintaining a database for storing information regarding which copies of the committed data page have been marked as having been changed.

6. The computer system of claim 1, wherein the second copy is made prior to the first copy.

7. A method, implemented at a computer system that includes one or more processors, for performing concurrent transactions, the method comprising:
creating a first copy of at least one data segment of a committed version of a data page for access by a first transaction;
creating a second copy of the at least one data segment of the committed version of the data page for access by a second transaction;
applying, by the first transaction, a change to the first copy of the at least one data segment;
committing, by the first transaction, the change to the first copy of the at least one data segment to the committed version of the data page, causing the at least one data segment of the committed version of the data page to be updated with the change; and
based on the first transaction committing the change to the first copy of the at least one data segment:
detecting that the second copy the at least one data segment should be automatically updated in order to preserve atomicity, consistency, isolation, and durability standards of the second transaction; and
automatically updating the second copy the at least one data segment with the at least one data segment of the committed version of the data page that has been updated with the change by the first transaction.

8. The method of claim 7, further comprising locking the at least one data segment of the committed data page based the first transaction applying the change to the first copy of the at least one data segment.

9. The method of claim 8, further comprising discarding the lock upon updating the second copy the at least one data segment with the at least one data segment of the committed version of the data page.

10. The method of claim 8, wherein the committed data page is locked at the row level.

11. The method of claim 7, further comprising:
marking the second copy to indicate that the change was made to the first copy by the first transaction.

12. The method of claim 11, further comprising tracking a space availability on the committed data page across any transactions working on the committed data page.

13. The method of claim 12, wherein the change made by the first transaction comprises the insertion of data, the method further comprising:
determining that there is sufficient space available for the insertion of data into the data page.

14. The method of claim 11, further comprising:
maintaining a database for storing information regarding which copies of the committed data page have been marked as having been changed.

15. The method of claim 14, wherein detecting that the second copy the at least one data segment should be automatically updated comprises:
accessing the database to identify information that indicates that the committed data page has been changed.

16. The method of claim 7, wherein the second copy is made prior to the first copy.

17. One or more hardware storage devices having stored thereon computer executable instructions which, when executed by one or more processors, performs a method comprising:
creating a first copy of at least one data segment of a committed version of a data page for access by a first transaction;
creating a second copy of the at least one data segment of the committed version of the data page for access by a second transaction;
applying, by the first transaction, a change to the first copy of the at least one data segment;
committing, by the first transaction, the change to the first copy of the at least one data segment to the committed version of the data page, causing the at least one data segment of the committed version of the data page to be updated with the change; and
based on the first transaction committing the change to the first copy of the at least one data segment:
detecting that the second copy the at least one data segment should be automatically updated in order to preserve atomicity, consistency, isolation, and durability standards of the second transaction; and
automatically updating the second copy the at least one data segment with the at least one data segment of the committed version of the data page that has been updated with the change by the first transaction.

18. The one or more hardware storage devices of claim 17, wherein the second copy is made prior to the first copy.

* * * * *